United States Patent
Wilson et al.

(10) Patent No.: US 8,675,335 B2
(45) Date of Patent: *Mar. 18, 2014

(54) FIBRE REINFORCED COMPOSITE STRUCTURES AND METHOD OF MANUFACTURE

(75) Inventors: Robert Samuel Wilson, Belfast (GB); William James Trevor Millar, Ballyclare (GB); Jonathan James McConnell, Belfast (GB)

(73) Assignee: Short Brothers PLC, Belfast, Antrim (GB)

( * ) Notice: Subject to any disclaimer, the term of this patent is extended or adjusted under 35 U.S.C. 154(b) by 402 days.

This patent is subject to a terminal disclaimer.

(21) Appl. No.: 13/122,340

(22) PCT Filed: Oct. 3, 2008

(86) PCT No.: PCT/GB2008/050903
§ 371 (c)(1),
(2), (4) Date: Apr. 1, 2011

(87) PCT Pub. No.: WO2010/037991
PCT Pub. Date: Apr. 8, 2010

(65) Prior Publication Data
US 2011/0174536 A1 Jul. 21, 2011

(51) Int. Cl.
*H05F 3/00* (2006.01)
(52) U.S. Cl.
USPC .......................................... 361/218
(58) Field of Classification Search
USPC .......................................... 361/218
See application file for complete search history.

(56) References Cited

U.S. PATENT DOCUMENTS

| | | | |
|---|---|---|---|
| 3,755,713 A * | 8/1973 | Paszkowski | 361/218 |
| 3,989,984 A | 11/1976 | Amason et al. | |
| 4,599,255 A * | 7/1986 | Anglin et al. | 428/73 |
| 4,746,389 A | 5/1988 | DiGenova | |
| 6,327,132 B1 | 12/2001 | Andrivet et al. | |
| 2004/0188890 A1 | 9/2004 | Sheridan et al. | |

FOREIGN PATENT DOCUMENTS

| | | |
|---|---|---|
| EP | 1 484 245 | 12/2004 |
| ES | 2 006 356 | 4/1989 |
| FR | 2 626 629 | 8/1989 |
| GB | 2 421 926 | 7/2006 |
| WO | WO 2006/069996 | 7/2006 |
| WO | WO 2008/105897 | 9/2008 |

OTHER PUBLICATIONS

International Search Report for PCT/GB2008/050903 dated Sep. 2, 2009.

* cited by examiner

*Primary Examiner* — Stephen W Jackson
(74) *Attorney, Agent, or Firm* — Thomas & Karceski, PC

(57) ABSTRACT

In the formation of a fiber reinforced composite material component produced by a resin transfer infusion process such as to have an electrically conductive surface layer for lightning strike protection wherein the component is to be drilled and countersunk to receive an electrically conductive fastener, a localized part of the electrically conductive mesh is deformed so as to be relocated in the countersunk recess thus to ensure electrical contact with the fastener when inserted and to eliminate any gap between the mesh and the fastener, thus determining the electrical conductive integrity of the mesh to avoid arcing in the event of lightning strike attachment.

19 Claims, 5 Drawing Sheets

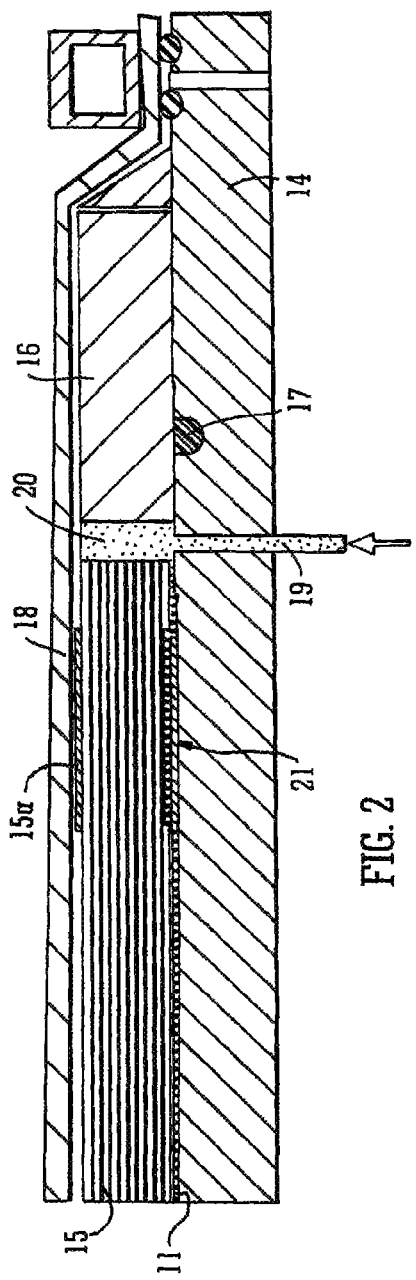
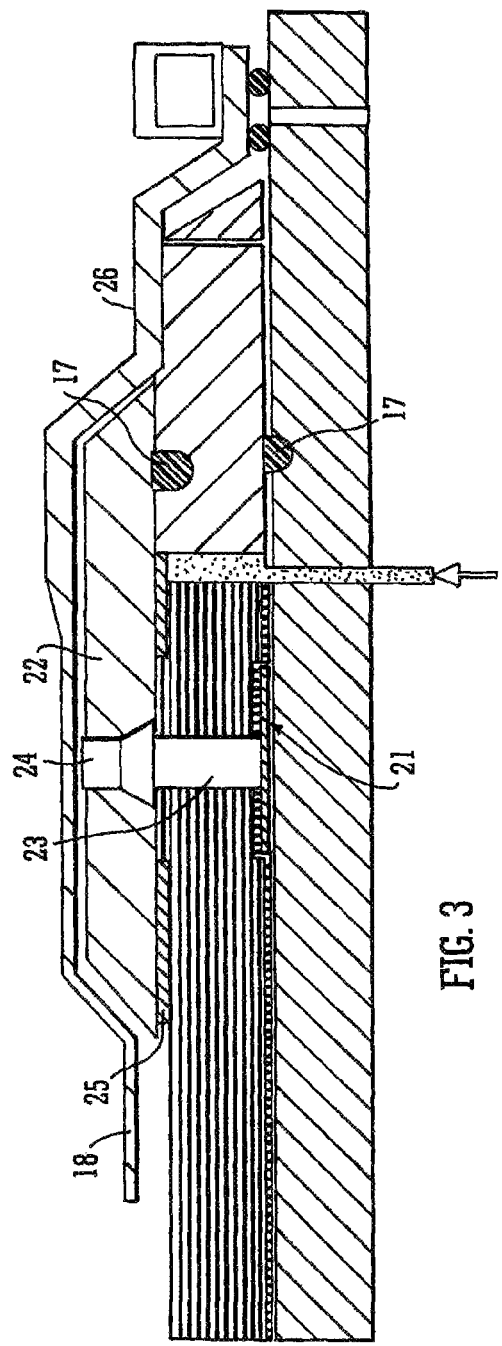
FIG. 2
FIG. 3

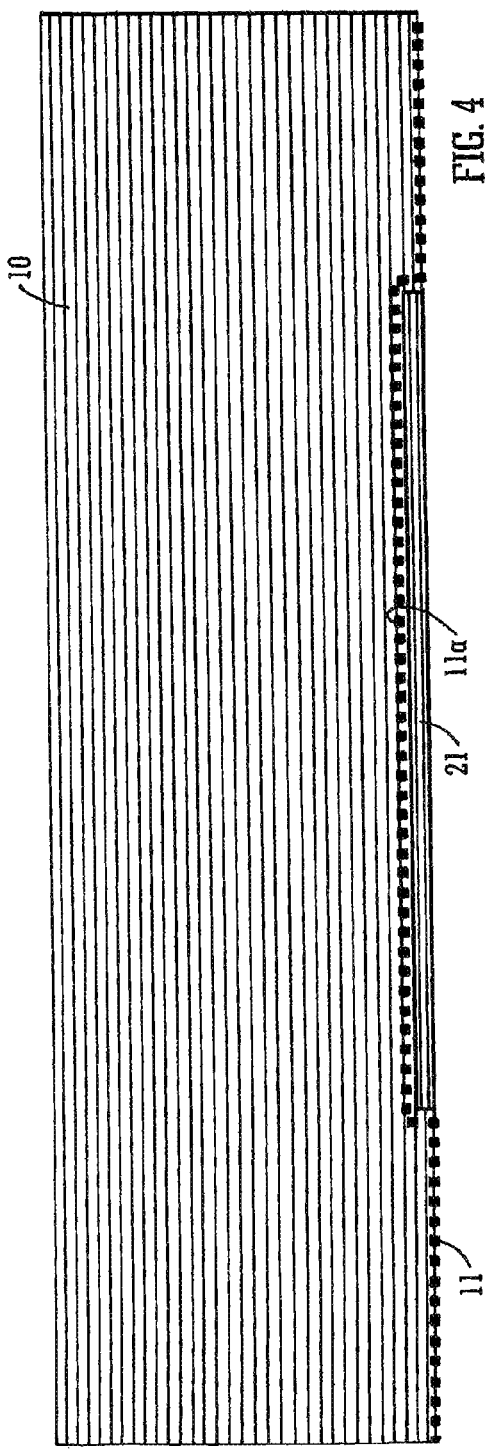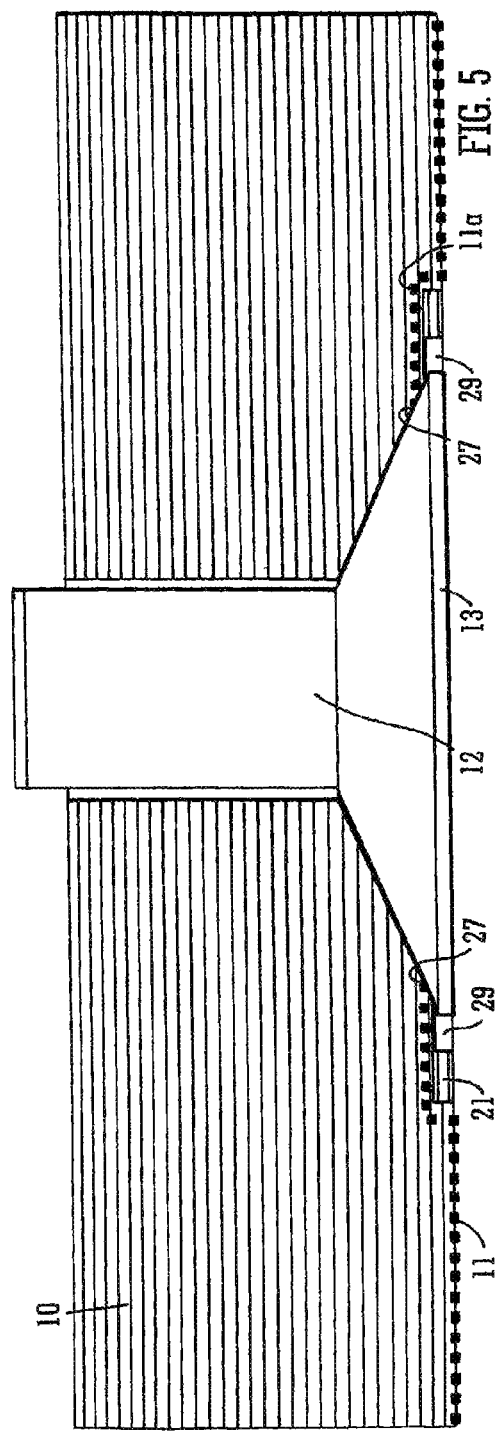

FIBRE REINFORCED COMPOSITE STRUCTURES AND METHOD OF MANUFACTURE

CROSS-REFERENCE TO RELATED APPLICATIONS

This is a National Stage Entry into the United States Patent and Trademark Office from International PCT Patent Application No. PCT/GB2008/050903, having an international filing date of 3 Oct. 2008, the contents of which is incorporated herein by reference.

FIELD OF THE INVENTION

This invention concerns fibre reinforced composite structures formed by liquid resin impregnation into fibrous preforms and curing the resin to form the composite structure.

DESCRIPTION OF THE RELATED ART

Advanced composite materials, specifically carbon/epoxy materials for the manufacture of, for example, airframe structures, have, in recent years, been used significantly, more commonly for both commercial and military aircraft. The objective has been to produce lightweight structures which are corrosion and fatigue resistant. Specifically, weight reductions of between 15% and 25% have been achieved due to improved strength and stiffness, and this has resulted in considerably reduced maintenance and inspection costs as a result of the improved fatigue resistant properties achieved. The technique also enables the production of smooth aerodynamic profiles while avoiding the high tooling costs incurred in producing metallic components with complex three dimensional curvature.

Current design practices require the use of metallic fasteners to attach together components such as ribs, spars and in some cases stiffeners, to an external skin. If the skin should form part of a fuel tank or other structural element that may be exposed to direct lightning strike, there is a considerable risk, particularly in the case of direct lightning attachment to a fastener head, of arcing within the fastener hole and at the tail of the fastener. Such arcing is a potential source of ignition and thus may cause catastrophic damage to the surrounding laminate structure that, at least, will increase the cost of repair and reduce the despatch reliability of an associated aircraft.

SUMMARY OF THE INVENTION

It is an object of the present invention to prevent arcing within and around the fastener hole by enhancing the electrical bonding between the fastener and an outer layer of electrically conductive lightning strike material such as metallic mesh.

Several attempts have been made to avoid the risk of arcing between fasteners and the surrounding component surface, but in many cases these have resulted in increased weight of the component or the cost of its production, or have resulted in uneven finished surfaces resulting, possibly, in increased aerodynamic drag.

Laminating processes have been developed for the production of composite material components, which involve infusion of low viscosity structural resin into dry carbon fibre preforms which are preformed layers of carbon fibres fixed in predetermined orientations. Such processes are often referred to as 'resin transfer moulding' (RTM) or 'liquid resin infusion', two examples of which include 'Vacuum assisted resin transfer infusion' (VARTI) and 'resin transfer infusion' (RTI), and involve the provision of a hard base tool for the formation of the intended component, laying up a reinforcing fibre preform on the tool and providing a flexible bagging blanket overlying the lay up region and cooperating with the tool face to form a sealed enclosure which encloses the reinforcing fibre preform, a liquid resin source and a liquid resin inlet which communicates with the sealed enclosure and which is connected to the liquid resin source for injection of the liquid resin into the sealed enclosure for liquid resin impregnation of the reinforcing fibre preform. The preform is thus "wetted out" fully by the resin and as a result of the pressure applied by the bagging blanket, and the control of operating temperature, the resin is cured to form the finished component.

In such a process, lighting strike protection may be afforded by providing an electrically conductive material surface layer on one or both faces of the component. This is done by placing the material on the face of the hard base tool thus to lie between the tool and the fibrous preform so that after introduction and curing of the resin the electrically conductive layer is formed with, and lies at, what will become an outer surface of the component. Such a layer may be provided, for example, in the form of an expanded copper mesh having a thickness in the region of 0.1 mm and a strand width also in the region of 0.1 mm to define an open area between the strands in excess of 70% of the surface area of the component.

When it is necessary to attach two such components together, screwed and countersunk fasteners are often used and so there is introduced a risk that the integrity of the electrically conductive layer is disrupted where the countersunk fastener is inserted into the pre-drilled component, particularly around the peripheral edge of the countersunk fastener. It is therefore intended, in accordance with the invention, to maintain the integrity of the electrically conductive layer thus reducing the voltage difference and the current density to prevent arcing at and around such a fastener.

According to the present invention there is provided a method of forming a fibre reinforced composite material component having an electrically conductive material surface layer into which an electrically conductive member is to be inserted, comprising the steps of placing an electrically conductive material on a hard base tool presenting a tool face, laying up a fibrous material preform over the electrically conductive material, overlaying the fibrous material preform with a flexible bagging blanket to form, with the fibrous preform, the electrical conductive material, and the hard base tool, a sealed enclosure, injecting a liquid resin into the sealed enclosure for infusion into the fibrous preform, externally pressurising the sealed enclosure and controlling the internal temperature thereof to cure the resin and form the component with the electrically conductive material layer at the surface thereof; characterised by the step of locating, in the region of the component intended to receive an electrically conductive member, beneath the surrounding surface of the preform adjacent the hard base tool, a part of the electrically conductive material such that upon subsequent drilling and countersinking of the composite material component, electrically conductive material is exposed in the countersunk recess of the component for electrical contact with the electrically conductive member upon insertion, whereby electrically conductive integrity is, ensured between the electrically conductive layer and the electrically conductive member.

The part of the electrically conductive material located beneath the surface of the fibrous preform may be of a size greater than the maximum diameter to which the component is countersunk.

The part of the electrically conductive material may be deformed to penetrate the fibrous preform in said region by providing a raised abutment on the hard base tool.

The raised abutment may be integrally formed with the hard base tool or provided as a separate item.

The raised abutment may be one or more layers of fibrous material or it may be at least one removable shim.

Alternatively, the raised abutment may be formed by or supplemented by a curable filling material.

At least one additional layer of electrically conductive material may be superimposed upon the electrically conductive surface layer in the region in which the electrically conductive member is to be inserted.

The electrically conductive surface layer may be a metallic mesh.

A dished electrically conductive cap may be inserted in the countersunk recess of the component, the peripheral region of the cap being placed in electrically conductive contact with the electrically conductive material layer.

According to a further aspect of the invention there is provided a composite material component having at least at one surface thereof an electrically conductive material surface layer and the component being drilled and countersunk to receive an electrically conductive fastener, a part of the electrically conductive layer being exposed within the countersunk recess so formed and beneath the surrounding adjacent surface of the component, such that a fastener introduced into the countersunk recess is in electrical contact with, and forms an electrically conductive path across the electrically conductive layer.

The component may be formed from a dielectric, fibre reinforced, resin impregnated material.

The electrically conductive material surface layer may be a metallic mesh, a woven metallic mesh, a metal-coated carbon fibre weave, or a sprayed metallic coating.

The part of the electrically conductive layer exposed within the countersunk recess may be a localised deformation of the electrically conductive material.

At least one additional layer of electrically conductive material may be superimposed upon the electrically conductive surface layer in the region in which the electrically conductive member is to be inserted.

A dished electrically conductive cap may be located in the countersunk recess, the peripheral region of the cap being in electrical contact with the electrically conductive material layer.

BRIEF DESCRIPTION OF THE DRAWINGS

An embodiment of the invention will now be described, by way of example only, with reference to accompanying drawings, in which:

FIG. 2 illustrates schematically a system for forming a composite material component in accordance with the invention;

FIG. 3 is a view similar to FIG. 2 showing a modified system;

FIG. 4 illustrates, in cross-section, a composite material component formed by the system illustrated in FIGS. 2-3;

FIG. 5 shows a component of FIG. 4 after drilling and countersinking to receive a fastener and with the fastener introduced

DETAILED DESCRIPTION OF EMBODIMENT(S) OF THE INVENTION

In the production of fibre reinforced composite components certain laminating processes have been developed which involve infusion of low viscosity structural resin into pre-shaped 'dry' carbon fibre preforms, ie, layers of carbon fibres fixed in predetermined orientations, and these processes include resin transfer moulding (RTM) and its various derivatives with various acronyms, VARTM, VARI, VAP, SLI, DRIFT, RFI, SCRIMP, covering both in and out of autoclave processes. The applicants have developed a variation of RTM entitled Resin Transfer Infusion (RTI) which is a hybrid of RTM and autoclave technologies. RTI offers a highly cost effective, production robust, process especially applicable for the production of large monolithic primary structures and/or very large fairings/fan cowl doors for aircraft production. Both RTI and RTM enable the use of textile technologies such as 'LIBA' non-crimp fabrics and braids together with conventional 2D and 3D weaves, dry tow placement and stitching.

Figure 1:
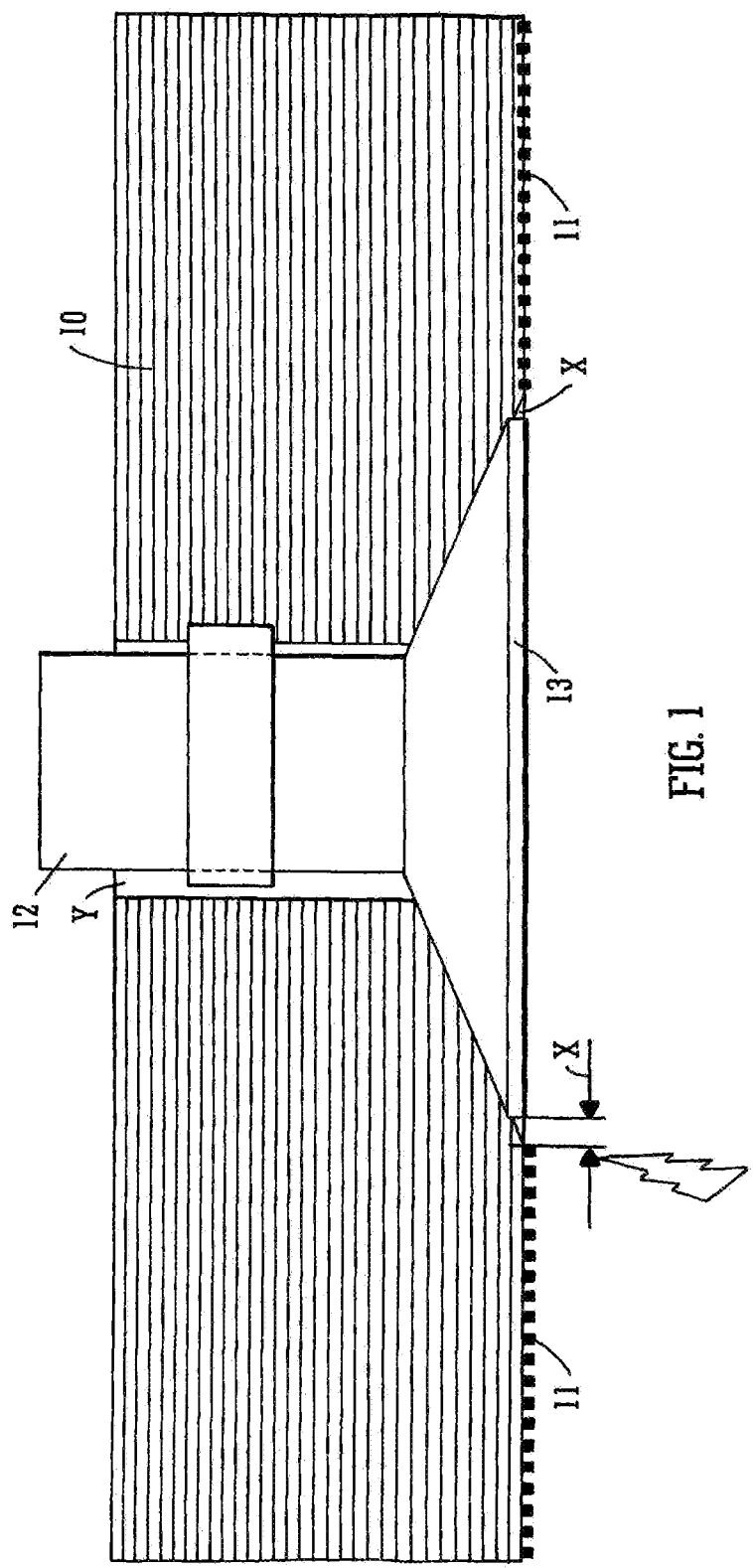
FIG. 1 illustrates, in cross-section, a fibre reinforced composite material component formed by resin impregnation of a fibrous preform and having an electrically conductive layer for lightning strike protection, and showing a fastener introduced into the component, but without electrically conductive integrity across the fastener.

Referring now to the drawings, FIG. 1 shows a fibre reinforced composite component 10 produced by a resin transfer infusion process as will be described in further detail, at one surface of which, and incorporated during the RTI process, is an electrically conductive lightning strike mesh layer 11 which serves to disperse the electrical charge in the event of lightning strike attachment to the component. Such a material may be, for example, an expanded copper mesh having a thickness in the region of 0.1 mm and a strand width also in the region of 0.1 mm to define, between the strands, an open area which is typically 70% of the surface area of the component. It should however be noted that the open area can vary with the amount of lightning strike protection needed. Such a material may be of the type known by the registered trade mark DEXMET.

The component 10 is shown as having been drilled and countersunk to receive a metallic and electrically conductive fastener 12. However, the head of the fastener typically does not have a sharply defined peripheral edge but rather a stepped edge, as shown at 13, and so a gap is left around the head of the fastener 12 as illustrated at X, with the result that electrical conductivity between the lightning strike mesh 11 and the electrically conductive fastener 12 is disrupted around the periphery of the fastener. Also, for ease of fit, the diameter to which the component 10 is drilled is generally slightly larger than that of the shank of the fastener 12, with the result that a further gap Y exists within the component around the fastener. A still further gap could result from the pulling action of the countersink drill, which often results in small sections of mesh at the periphery being removed.

In the event of lighting strike attachment to the fastener or to the mesh 11 in the region of the fastener, arcing can occur at X and/or at Y and the object of the present invention is to avoid the risk of such arcing by ensuring the integrity of the conductive path across the mesh 11.

FIG. 2 show an assembly of parts for the production of a reinforcing fibre composite component, including a hard base tool 14 upon which is laid up a dry fibrous preform 15 with an electrically conductive lightning strike mesh 11 superimposed between the tool 14 and the preform 15. A periphery bar 16 with location pegs and grooves 17 is disposed on the tool 14 around the periphery of the area in which the preform 15 is laid, and the assembly is completed by a flexible bagging blanket 18 to form, with the tool 14, a sealed enclosure containing the preform 15 and mesh 11.

A liquid resin inlet 19 is connected to a supply of liquid resin which, as shown at 20, is introduced into the sealed enclosure to become infused into the fibrous preform 15 which thus becomes fully 'wetted out' with the resin whereupon the resin supply is arrested, the whole assembly is subjected to external pressure and controlled temperature in an autoclave whereby the resin/preform system is cured to form the finished component 10.

As illustrated in FIGS. 2 and 4, an abutment or spacer 21 is provided on the tool 14 thus to deform and relocate an adjacent portion 11a of the mesh 11 to lie within the fibrous structure beneath the surrounding surface of the preform 15, prior to introduction of the resin 20. The abutment 21 may be in the form of a removable polymeric or metallic shim or it may be formed from additional fibrous layers similar to the material of the preform 15. Thus, as shown in FIG. 4, after resin infusion and curing, the mesh 11 is indented at 11a and partially embedded but remains electrically intact. In an alternative arrangement the abutment 21 may be formed integrally with the tool 14. The presence of the abutment may force some of the fibrous material of the preform 15 to protrude above the opposite surface of the preform locally as illustrated at 15a in FIG. 2. This will be accommodated as will be described.

Referring now to FIG. 3, in a similar arrangement there may be included a so-called control plate 22 which is located above the preform 15 and partly above the periphery bar 16 thus, with the periphery bar and the hard base tool 14 to determine accurately the thickness of the finished component as determined by the defined space between the control plate 22 and the hard base tool 14 in the region occupied by the control plate. In such an arrangement a spacer pin 23 is positioned in a pre-drilled aperture within the preform 15 and serves to support the control plate 22 by means of a hard location member 24, thus again accurately to determine the finished thickness of the component.

The presence of the abutment 21 and the resultant protrusion 15a above the opposite surface of the preform 15, in the presence of the control plate 22, results in a free space beneath those parts of the control plate 22 not occupied by the protrusion 15a. This free space is illustrated, for example, at 25 and becomes filled with resin which thus forms a liquid shim prior to the curing of the resin. Alternatively, the surplus fibrous material can be removed in advance either from beneath or above the preform in the region of the abutment 21. Accurate location and the relative disposition of the periphery bar 16 and the control plate 22 is ensured by the location grooves and pegs 17. In the example illustrated, in the region of the periphery bar, the flexible bagging blanket 18 is strengthened and/or thickened as shown at 26 to provide adequate control over the accurate positioning of the members beneath it.

As can be seen from FIG. 4, continuity of the lightning strike mesh 11 is maintained notwithstanding the provision of the abutment 21, the mesh being merely deformed locally and relocated at 11a beneath the adjacent surface of the preform 15. In this example, the abutment 21 is shown in the form of additional fibrous layers which become resin-impregnated with the remainder of the component.

After production of the composite component, as illustrated and described in relation to FIGS. 2 and 3, the component is drilled and countersunk to receive the fastener 12 in a similar manner to that shown in FIG. 1 but in this case, a localised part of the mesh 11 has become embedded beneath the surface of the preform 15, and is exposed within the countersunk recess by initially removing or shimming a part of the abutment 21 as shown at 29 to expose mesh 11a. The shimming area is greater than the head area of the fastener 12 but less than the area of abutment 21. After shimming, the material is drilled to make the hole and then countersunk to receive the fastener head. Thus, the primary contact occurs between side of fastener and side of mesh 11a as shown as 27. The depth of abutment 21 is determined by the dimensions of fastener 12 head. The continuity and integrity of the electrically conductive layer thus avoids the risk of arcing around the fastener in the event of lightning strike attachment to the fastener. The remaining shallow peripheral recess 29 around the fastener may be filled with an air wash filling compound to maintain a smooth, finished surface of the component thus avoiding any risk of aerodynamic drag when the component is in use.

Figure 6:
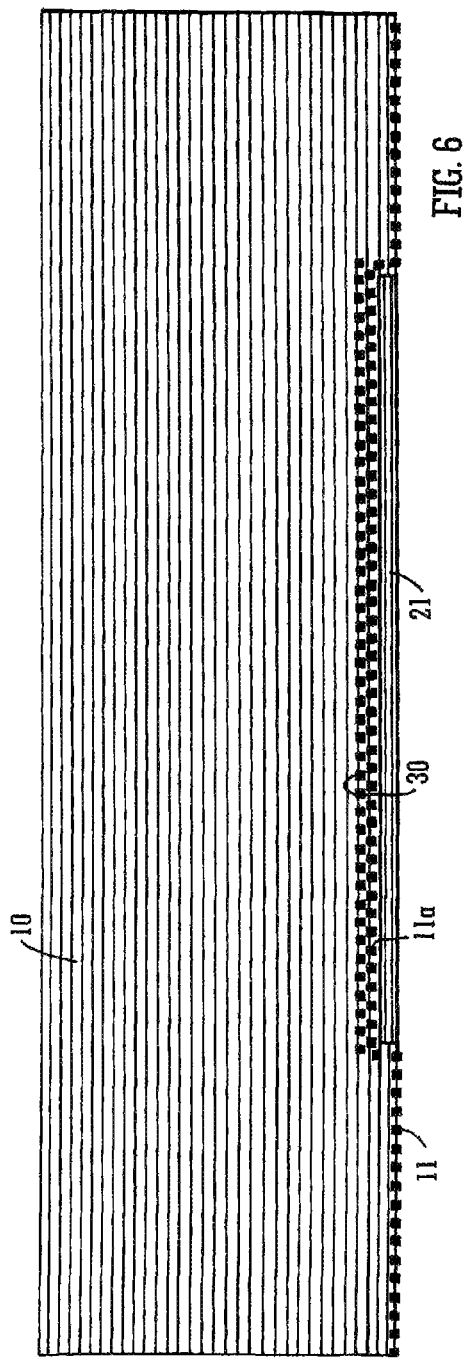
FIG. 6 is a view similar to FIG. 4 according to a modified procedure in accordance with the invention.
Figure 7:
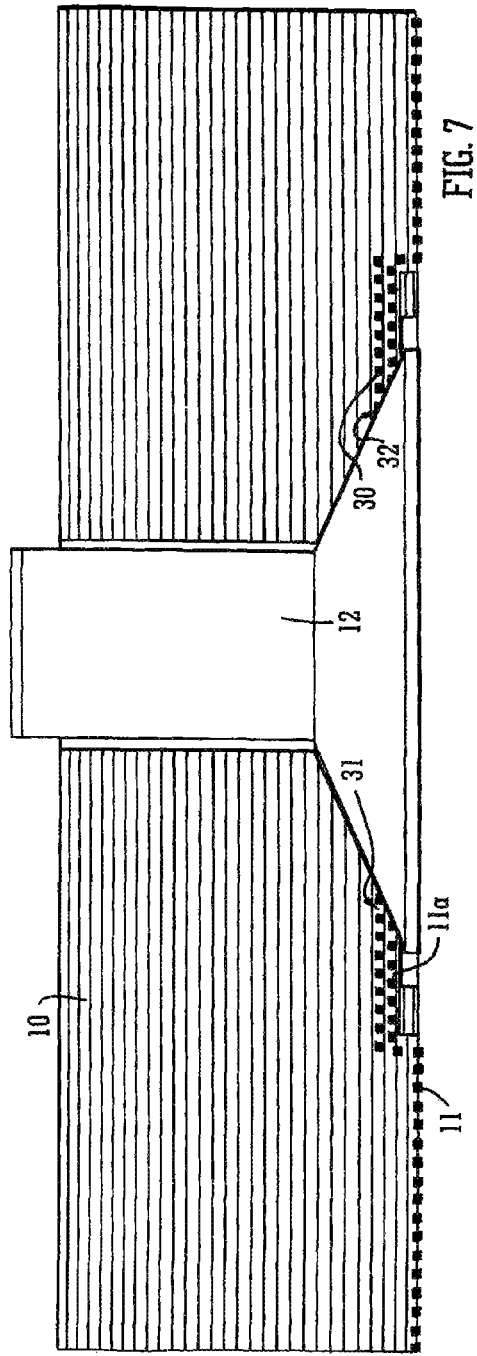
FIG. 7 shows the component of FIG. 6 drilled and countersunk to receive a fastener and with the fastener introduced.

Referring now to FIG. 6, if required, an additional layer 30 of electrically conductive lightning strike mesh may be provided in contact with the layer 11 in the region in which the fastener is to be inserted thus to ensure, in effect, a double contact with the fastener head, as can be seen at 31 and 32 in FIG. 7. This will help to compensate for any imperfect fit of the fastener head against the wall of the countersunk recess in the event that the fastener is perhaps slightly misaligned when inserted into the component. Another important purpose of the increased thickness is to give more flexibility with respect to the depth of shimming ie, the thicker it is, the less precise the shimming has to be.

Figure 8:
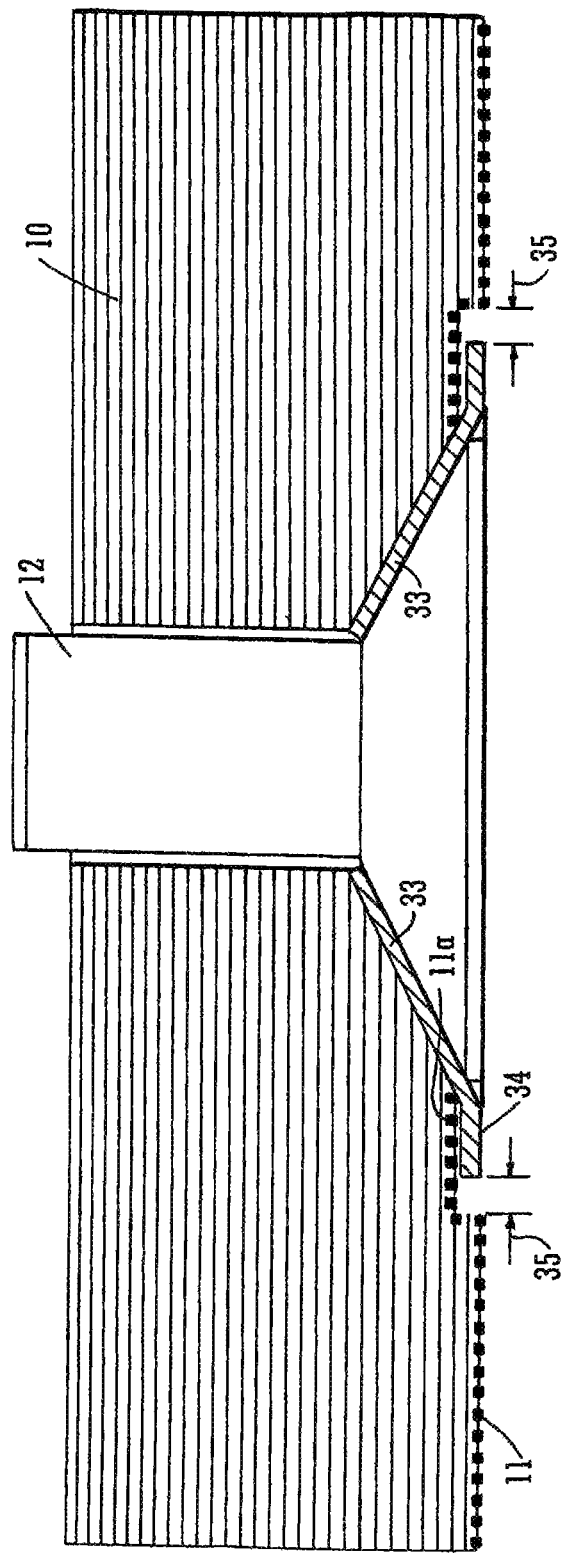
FIG. 8 shows a further modification.

In a further example, as illustrated in FIG. 8, a dished copper cap may be inserted in the countersunk recess prior to introduction of the fastener. The cap 33 may have a peripheral flange 34 making extended contact with the mesh 11 where the latter is located beneath the surrounding surface of the preform so that the outer surface of the flange 34 of the cap 33 is substantially flush with the outer surface of the component, again to avoid aerodynamic drag. The gaps illustrated at 35 may be filled with an air wash filling compound to ensure a completely smooth surface. The provision of a copper cap 33 within the countersunk recess assists in reducing the electrical resistance and hence potential difference between the fastener and the surrounding structure.

The depth of the shimming as in FIGS. 5 and 7 must be great enough to accommodate the cap flange 34 which also may be inclined upwardly and outwardly to achieve a good contact with the mesh 11a. Its upper surface may be roughened, again to achieve good electrical contact with the mesh.

In all of the examples illustrated and described, the component is drilled and countersunk after curing of the resin within the component.

In use, therefore, during a lightning strike attachment to the fastener the risk of arcing is at least substantially eliminated to minimise damage to the surrounding composite structure and to reduce the risk of molten arc products being ejected from around the fastener, which is particularly advantageous in a flammable vapour environment such as a fuel tank. The presence of a ground path through the fastener will promote lightning strike attachment to the surrounding mesh and hence the charge will be dispersed safely.

The metallic mesh 11, 11a may, alternatively, be a woven metallic mesh, a metal-coated carbon fibre weave, or a sprayed metallic coating.

The invention claimed is:

1. A method of forming a fiber reinforced composite material component having an electrically conductive material surface layer into which an electrically conductive member is to be inserted, comprising:

placing an electrically conductive member on a hard base tool presenting a tool face, laying up a fibrous material preform over the electrically conductive material, overlaying the fibrous preform with a flexible bagging blanket to form, with the fibrous preform, and the hard base tool, a sealed enclosure, injecting a liquid resin into the sealed enclosure for infusion into the fibrous preform, externally pressurizing the sealed enclosure and controlling the internal temperature thereof to cure the resin and form the component with the electrically conductive material layer at the surface thereof, and locating, in the region of the component intended to receive the electrically conductive member, beneath the surrounding surface of the preform adjacent the hard base tool, a part of the electrically conductive material such that upon subsequent drilling and countersinking of the composite material component, electrically conductive material is exposed in the countersunk recess of the component for electrical contact with the electrically conductive member upon insertion, whereby electrically conductive integrity is ensured between the electrically conductive layer and the electrically conductive member.

2. The method according to claim 1, wherein the part of the electrically conductive material located beneath the surface of the fibrous preform is of a size greater than the maximum diameter to which the component is countersunk.

3. The method according to claim 1 wherein part of the electrically conductive material is deformed to penetrate the fibrous preform in said region by providing a raised abutment on the hard base tool.

4. The method according to claim 3 wherein the raised abutment is integrally formed with the hard base tool.

5. The method according to claim 3 wherein the raised abutment is provided as a separate item.

6. The method according to claim 3 wherein the raised abutment is formed from at least one layer of a fibrous material.

7. The method according to claim 3 wherein the raised abutment is provided in the form of at least one removable shim.

8. The method according to claim 3 wherein the raised abutment is formed by or supplemented by a curable filling material.

9. The method according to claim 1 in which at least one additional layer of electrical conductive material is superimposed upon the electrically conductive surface layer in the region in which the electrically conductive member is to be inserted.

10. The method according to claim 1 wherein the electrically conductive surface layer is a metallic mesh.

11. The method according to claim 1 wherein a dished electrically conductive cap is inserted in the countersunk recess of the component, the peripheral region of the cap being placed in electrically conductive contact with the electrically conductive material layer.

12. A composite material component having, at least at one surface thereof, an electrically conductive material surface layer and the component being drilled and countersunk to receive an electrically conductive fastener, a part of the electrically conductive layer being exposed within the countersunk recess so formed and beneath the surrounding adjacent surface of the component, such that a fastener introduced into the countersunk recess is in electrical contact with, and forms an electrically conductive path across the electrically conductive layer.

13. The composite material component according to claim 12 formed from a dielectric, fiber reinforced, resin impregnated material.

14. The composite material component according to claim 12 wherein the electrically conductive material surface layer is a metallic mesh.

15. The composite material component according to claim 12 wherein the electrically conductive material surface layer is a metal-coated carbon fiber weave.

16. The composite material component according to claim 12 wherein the electrically conductive material surface layer is a sprayed metallic coating.

17. The composite material component according to claim 12 wherein the part of the electrically conductive layer exposed within the countersunk recess is a localized deformation of the electrically conductive material surface layer.

18. The composite material component according to claim 12 including at least one additional layer of electrically conductive material superimposed upon the electrically conductive material surface layer in the region in which the electrically conductive member is to be inserted.

19. The composite material component according to claim 12 including a dished electrically conductive cap located in the countersunk recess, the peripheral region of the cap being in electrical contact with the electrically conductive material surface layer.

* * * * *